(12) United States Patent
Osada et al.

(10) Patent No.: US 7,851,050 B2
(45) Date of Patent: Dec. 14, 2010

(54) LAMINATED FILM

(75) Inventors: Shunichi Osada, Shiga (JP); Hirofumi Hosokawa, Tokyo (JP); Tetsuya Tsunekawa, Shiga (JP)

(73) Assignee: Toray Industries, Inc., Tokyo (JP)

( * ) Notice: Subject to any disclaimer, the term of this patent is extended or adjusted under 35 U.S.C. 154(b) by 141 days.

(21) Appl. No.: 10/575,777

(22) PCT Filed: Oct. 14, 2004

(86) PCT No.: PCT/JP2004/015114

§ 371 (c)(1),
(2), (4) Date: Jan. 9, 2007

(87) PCT Pub. No.: WO2005/037544

PCT Pub. Date: Apr. 28, 2005

(65) Prior Publication Data

US 2007/0128419 A1  Jun. 7, 2007

(30) Foreign Application Priority Data

Oct. 14, 2003  (JP) .............................. 2003-353286

(51) Int. Cl.
*B32B 7/02* (2006.01)
(52) U.S. Cl. ................. 428/212; 428/213; 428/421; 428/480; 428/446; 428/483; 428/498; 428/216
(58) Field of Classification Search ................ 428/216, 428/212, 213, 421, 480, 446, 483, 498; 349/106; 524/501
See application file for complete search history.

(56) References Cited

U.S. PATENT DOCUMENTS

| 3,711,176 | A | * | 1/1973 | Alfrey et al. ................. 359/359 |
| 3,854,796 | A | * | 12/1974 | Thelen ........................ 359/588 |
| 4,989,729 | A |   | 2/1991 | Huang |
| 5,103,337 | A | * | 4/1992 | Schrenk et al. ............. 359/359 |
| 5,126,880 | A | * | 6/1992 | Wheatley et al. ............ 359/587 |
| 5,225,244 | A | * | 7/1993 | Aharoni et al. ............. 427/240 |
| 5,233,465 | A | * | 8/1993 | Wheatley et al. ............ 359/359 |
| 5,360,659 | A | * | 11/1994 | Arends et al. ............... 428/216 |
| 5,540,978 | A |   | 7/1996 | Schrenk ........................ 428/212 |
| 5,612,820 | A | * | 3/1997 | Schrenk et al. ............. 359/498 |
| 5,872,653 | A | * | 2/1999 | Schrenk et al. ............. 359/498 |
| 6,531,230 | B1 | * | 3/2003 | Weber et al. ................. 428/480 |
| 6,583,930 | B1 | * | 6/2003 | Schrenk et al. ............. 359/495 |
| 6,926,952 | B1 | * | 8/2005 | Weber et al. ................. 428/212 |
| 2001/0046086 | A1 | * | 11/2001 | Wheatley et al. ............ 359/494 |

FOREIGN PATENT DOCUMENTS

| JP | 9-506837 A | 7/1997 |
| JP | 2003-112355 A | 4/2003 |
| JP | 2003-515754 A | 5/2003 |
| JP | 2003-205588 A | 7/2003 |
| JP | 2003-251675 A | 9/2003 |

* cited by examiner

*Primary Examiner*—Patricia L. Nordmeyer
*Assistant Examiner*—Michael B Nelson
(74) *Attorney, Agent, or Firm*—Birch, Stewart, Kolasch & Birch, LLP

(57) ABSTRACT

An object of the invention is to provide a laminated film which hardly gives transmission loss based on reflection or scattering, is excellent in heat resistance and humidity resistance, and has an arbitrarily-controlled refractive index distribution. Accordingly, the invention is a laminated film comprising 5 or more laminated resin layers; the thickness of each of the resin layers being from 1 to 100 nm; and the film having a layer structure wherein the thicknesses of resin layers having the same composition A, out of the resin layers, increase or decrease from the side of a surface of the laminated film toward the side of the other surface opposite thereto.

12 Claims, 5 Drawing Sheets

LAMINATED FILM

TECHNICAL FIELD

The present invention relates to a laminated film.

BACKGROUND ART

Sheet-form optical waveguides are suggested for optical communication/optical circuits, such as an optical cable and an optical waveguide, and for displays, such as a liquid crystal display, a plasma display, an EL display, and a projection screen.

For example, for optical communication/optical circuits, Patent Document 1 discloses a signal transmitting bus wherein light transmitting layers, which receives signal light and then diffuses and transmits the received signal light, and light blocking layers, which blocks the mixing of the signal light between adjacent ones out of the light transmitting layers, are alternately laminated. Such an optical waveguide has advantages that: the amount of crosstalks or electromagnetic noises therefrom is small; the waveguide is easily positioned; and a circuit board can be freely put on and taken off from the waveguide. However, this optical waveguide is of a step index type (SI type), and thus the waveguide is unsuitable for high-speed transmission. Additionally, there remains a problem that the loss of transmission is large at the time of bending the waveguide into a large curvature and using the bent waveguide.

As a manner capable of solving such problems of the SI type, for example, Patent Document 2 discloses an optical waveguide of a graded-index type (GI type), which has a refractive index distribution along its depth direction from its sheet surface. However, the GI type optical waveguide is formed by infiltrating and dispersing a sublimable or volatile organic compound, as disclosed in, for example, Patent Document 2; therefore, it is difficult to control the distribution precisely into a refractive index distribution like a square distribution ideal for the GI type optical waveguide, wherein mode distribution is hardly generated. In a high-temperature and high-humidity environment, the infiltrated and dispersed compound frequently diffuses, thereby causing a problem that the refractive index distribution changes with time.

For displays such as a screen, Patent Document 3 discloses a technique of controlling the refractive index distribution of an optical waveguide in accordance with the concentration distribution of nano particles having a large aspect ratio. However, the concentration distribution of the nano particles is not mechanically controlled. Thus, it is essentially difficult to attain a refractive index distribution high in precision, and there is also a problem that loss based on scattering is large.

Meanwhile, various films wherein a thermoplastic resin is laminated into a multilayered form are suggested. There are disclosed, for example, a product wherein a multi-layered film excellent in tearing resistance is caused to adhere onto a surface of a piece of glass, thereby preventing the glass from being damaged or scattered to a large degree (see, for example, Patent Documents 4 to 6); and a film wherein resins having different refractive indexes are alternately laminated into a multilayered form, thereby reflecting specific wavelengths selectively (see, for example, Patent Documents 7 to 9). Of these, the film on which specific wavelengths are selectively reflected acts as a filter for transmitting specified light rays or reflecting the specific light, and is used as a film for backlight in a liquid crystal display or the like.

However, the conventional laminated films give a large loss resulting from reflection based on the refractive index difference between layers therein, and cannot be applied to optical waveguides.

[Patent Document 1] Japanese Patent Application Laid-Open (JP-A-) No. 9-270752 (page 2)
[Patent Document 2] JP-A No. 2003-322742 (page 2)
[Patent Document 3] JP-A No. 2004-133473 (page 2)
[Patent Document 4] JP-A No. 6-190995 (page 2)
[Patent Document 5] JP-A No. 6-190997 (page 2)
[Patent Document 6] JP-A No. 10-76620 (page 2)
[Patent Document 7] JP-A No. 3-41401 (page 2)
[Patent Document 8] JP-A No. 4-295804 (page 2)
[Patent Document 9] Japanese Patent Application National Publication No. 9-506837 (page 2)

DISCLOSURE OF THE INVENTION

Problems to be Solved by the Invention

An object of the present invention is to solve the above-mentioned problems and provide a laminated film which hardly gives transmission loss based on reflection or scattering, is excellent in heat resistance and humidity resistance, and has an arbitrarily-controlled refractive index distribution.

Means for Solving the Problems

In order to solve the above-mentioned problems, the invention has the following structure:

[1] A laminated film, comprising 5 or more laminated resin layers; the thickness of each of the resin layers being from 1 to 100 nm; and the film having a layer structure wherein the thicknesses of resin layers having the same composition A, of the resin layers, increase or decrease from the side of a surface of the laminated film toward the side of the other surface opposite thereto.

[2] The laminated film according to item [1], comprising the resin layers having the composition A, and a resin layer having a composition B of the resin layers; and having a layer structure wherein the thickness ratio between the resin layer having the composition A and the resin layer having the composition B which are adjacent to each other increases or decreases from the side of the surface of the laminated film toward the side of the other surface opposite thereto.

[3] The laminated film according to item [1] or [2], comprising the resin layers having the composition A, and resin layers having a composition B of the resin layers; and having a layer structure wherein the thicknesses of the resin layers having the composition A increase from the side of the surface of the laminated film toward the side of the other surface opposite thereto, and thicknesses of the resin layers having the composition B decrease from the side of the surface of the laminated film toward the side of the other surface opposite thereto.

[4] The laminated film according to any one of items [1] to [3], having a layer structure wherein the thicknesses of the resin layers having the composition A increase or decrease from the side of the surface of the laminated film toward the center in the layer-laminated direction, and the thicknesses also increase or decrease from the side of the other surface toward the center in the layer-laminated direction.

[5] The laminated film according to any one of items [1] to [4], comprising two thermoplastic resins having a refractive index difference of 0.05 or more.

[6] The laminated film according to any one of items [1] to [5], wherein the thickness of each of a half or more of the layers constituting the laminated film is 30 nm or less.

[7] The laminated film according to any one of items [1] to [6], comprising a pair of adjacent ones out of the resin layers wherein the ratio between the thicknesses of the adjacent layers (the thickness of the thin layer/that of the thick layer) is 0.8 or more and 1.0 or less, and a pair of adjacent ones out of the resin layers wherein the ratio between the thicknesses of the adjacent layers is 0.01 or more and 0.5 or less.

[8] The laminated film according to any one of items [1] to [7], wherein the number of the laminated layers is 50 or more.

[9] The laminated film according to any one of items [1] to [8], wherein the maximum light ray reflectivity is 25% or less in a wavelength range of 400 to 2500 nm.

Advantageous Effects of the Invention according to the laminated film of the invention, the refractive index distribution thereof can be arbitrarily set, whereby various optical paths can be controlled; therefore, the laminated film can be made into a GI type optical waveguide and the waveguide can be good for high-speed transmission. When the laminated film is used as a light-conducting plate, an optical waveguide, or the like, the attenuation of light is small and further the dispersion thereof is also small. Accordingly, the film hardly gives a loss of the transmission thereof, has a large information transmission capacity, and can be used in a wide band. The film is also excellent in heat-resistance and humidity resistance.

BEST MODE FOR CARRYING OUT THE INVENTION

The laminated film of the present invention has a specific lamination structure wherein resin layers are laminated. In the lamination structure, the control of an optical path can be attained. The control of an optical path means: an optical waveguide effect that light advances in a film without substantially leaking outside; a lens effect that light is condensed or enlarged; an effect that a path of light is gradually curved as the light goes from one surface to the other surface opposite thereto; or the like.

Examples of the resin constituting the resin layers include thermoplastic resin, thermosetting resin, and UV curable resin. Of these, thermoplastic resin is preferred.

As the thermoplastic resin, for example, the following can be used:

polyolefin resins such as polyethylene, polypropylene, polystyrene, and polymethylpentene;
alicyclic polyolefin resins;
polyamide resins such as nylon 6 and nylon 66;
aramide resins;
polyester resins such as polyethylene terephthalate, polybutylene terephthalate, polypropylene terephthalate, polybutyl succinate, and polyethylene-2,6-naphthalate;
polycarbonate resins;
polyarylate resins;
polyacetal resins;
polyphenylene sulfide resins;
fluorine-contained resins such as tetrafluoroethylene resin, trifluoroethylene resin, trifluorochloroethylene resin, tetrafluoroethylene-hexafluoropropylene copolymer, and vinylidene fluoride resin;
acrylic resins;
methacrylic resins;
polyacetal resins;
polyglycolic acid resins;
polyimide resins; and
polylactic acid resins.

Of these, in particular, acrylic resins, polycarbonate resins, polystyrene, alicyclic polyolefin resins, and polyester resins are more preferred from the viewpoint of strength, heat resistance; transparency, and lowness in loss. These thermoplastic resins may each be a homo-resin, a copolymer or a blend wherein two or more kinds are mixed. It is allowable to add, to each of the layers, various additives such as an antioxidant, an antistatic agent, a crystal nucleus agent, organic particles, inorganic particles, a viscosity reducer, a thermal stabilizer, a lubricant, an infrared absorbent, an ultraviolet absorbent, and a doping agent for adjusting the refractive index.

The lamination structure preferably contains resin layers having different compositions. Examples of the combination of the resin layers having the different compositions include layers wherein resins themselves are different from each other, layers having different blend ratios, and layers different in the kind of additives or the added amount thereof.

It is preferred that the lamination structure contains two thermoplastic resins having a refractive index difference of 0.05 or more. The refractive index difference between the two thermoplastic resins contained in the lamination structure is more preferably 0.07 or more, even more preferably 0.1 or more. When the refractive index difference is set to 0.05 or more, the control of an optical path can be effectively attained.

About compositions A and B having a relationship which will be described later, the refractive index difference between the two is preferably an absolute value of 0.02 or more. The difference is more preferably 0.03 or more, even more preferably 0.05 or more. As the refractive index difference is larger, the control of an optical path is easier and further the numerical aperture can be made larger. The upper limit thereof is not particularly limited, and is preferably 0.4 or less in order to give a combination of compositions which makes the lamination of the layers with a high precision easy or restrain loss based on scattering.

It is important that the thickness of the resin layers is from 1 to 100 nm. When the thickness of the layers is set to 100 nm or less, the optical thickness thereof becomes a thickness which is not more than the wavelength of ordinarily used light. For this reason, light comes not to recognize interfaces between the layers apparently so that reflection and scattering come not to be easily caused. Furthermore, control into a substantially continuous refractive index change becomes possible. In other words, in the invention, the refractive index in an arbitrary range in a section of the film is controlled by the presence ratio between the resin layers having different refractive indexes present in the range. This has been unprecedentedly attained by the technique of the present invention, which will be described later, wherein the thickness of each of the layers can be arbitrarily controlled with a high precision. Since the refractive index distribution is controlled by such a technique, the invention makes it possible to control the refractive index distribution thereof with a higher precision as compared with the conventional methods. Additionally, it is unnecessary to use any sublimable material or any highly volatile material; therefore, a change in the refractive index distribution is not easily caused with the passage of time. In order to prevent the transmission loss of visible rays, the thickness of the layers is more preferably 80 nm or less. The thickness is even more preferably 50 nm or less to light having a wavelength in a range from blue rays to ultraviolet rays. For long-distance transmission, the thickness is even more preferably 30 nm or less. As the thickness of the resin layers is made smaller, scattering is further suppressed so that the loss of transmission tends to be made smaller. From such a viewpoint, the lower limit thereof is not particularly limited. If the limit is less than 1 nm, the control of the precision of the lamination or the check of the state of the lamination becomes difficult.

The ratio of the number of layers having a thickness of 30 nm or less to the number of the above-mentioned resin layers is preferably ½ or more, more preferably 75% or more, even more preferably 90% or more. When the ratio of the number of the layers having a thickness of 30 nm or less is set to ½ or more, reflection or scattering based on the refractive index difference between the layers is restrained so that loss of transmitted light can be decreased.

It is important that the number of the laminated resin layers having a thickness of 1 to 100 nm is 5 or more. The number is preferably 50 or more, more preferably 200 or more. If the number of the laminated layers is less than 5, it becomes difficult to make the layer thickness small. Thus, loss based on reflection is generated at spots where the layers are not completely formed. Moreover, it becomes difficult to introduce light into the optical waveguide. When the number of the laminated layers is 50 or more, the layers are easily laminated precisely into a thickness of 1 to 100 nm so that even control of light is easily attained. If the number of the laminated layers becomes larger, the region where an optical path can be controlled is widened so as to make optical connection or the like ease, which is preferred. The upper limit of the number of the laminated layers is not particularly limited. It is sufficient that the limit is 50000, considering a film thickness which gives a low loss and a good handleability.

It is important for the laminated film of the invention that in the above-mentioned lamination structure, the thicknesses of resin layers having the same composition A, out of the resin layers, increase or decrease from the side of a surface of the laminated film toward the side of the other surface opposite thereto. The refractive index distribution in the lamination can be controlled by controlling the thickness distribution of the resin layers which constitute the lamination.

Herein, given are examples of the lamination structure wherein the thicknesses of the resin layers having the same composition A increase or decrease from the side of a surface of the laminated film toward the side of the other surface opposite thereto. For example, the following film is supposed: a film having a layer structure wherein a/b/c/d/e/f/g/h/i/j . . . layers are laminated, in this order, in the thickness direction from the side of a surface thereof toward the other surface opposite thereto. When it is supposed that the resin layers having the same composition A are the a, c, e, g and i layers, the above-mentioned examples include a case where all of the layers are laminated to satisfy the following: the thickness of the a layer < that of the c layer < that of the e layer < that of the g layer < that of the i layer; and a case where all of the layers are laminated to satisfy the following: the thickness of the a layer > that of the c layer > that of the e layer > that of the g layer > that of the i layer.

About the b, d, f, h and j layers, the change in the layer thicknesses thereof and the composition thereof can be variously changed in order to cause the laminated film to have a target refractive index distribution. As will be described later, these layers are more preferably layers having a composition B.

The wording "from the side of a surface of the laminated film toward the side of the other surface opposite thereto" does not necessarily mean that the thicknesses consistently increase or decrease from the side of a surface of the laminated film toward the side of the other surface opposite thereto. For example, the wording also has the following meanings: a case where from the vicinity of a film surface as a start point to the vicinity of the center the thicknesses of the layers increase and subsequently the layer thicknesses decrease toward the other surface opposite thereto: and a case reverse thereto, where from the vicinity of a film surface as a start point to the vicinity of the center the thicknesses of the layers decrease and subsequently the layer thicknesses increase toward the other surface opposite thereto.

In other words, it is also preferred that the laminated film of the invention has a layer structure wherein the thicknesses of the resin layers having the composition A increase or decrease from the side of the surface of the laminated film toward the center in the layer-laminated direction, and the thicknesses also increase or decrease from the side of the other surface toward the center in the layer-laminated direction. In such a case, the refractive index of the cross section center of the film is higher or lower than that of the surface portions of the film. In particular, in the case that the refractive index of the cross section center of the film is high, the laminated film is suitable as a film having a cylindrical lens or a GI type optical waveguide. It is more preferred that such a thickness change is symmetric. It is even more preferred that the thicknesses of the resin layers having the composition A increase or decrease from the side of the surface of the laminated film toward the center in the layer-laminated direction; the thicknesses also increase or decrease from the side of the other surface toward the center in the layer-laminated direction; and the distribution of the thicknesses is like a quadratic function.

It is also preferred that the laminated film of the invention comprises the resin layers having the composition A, and a resin layer having a composition B out of the resin layers; and has a layer structure wherein the thickness ratio between the resin layer having the composition A and the resin layer having the composition B which are adjacent to each other increases or decreases from the side of the surface of the laminated film toward the side of the other surface opposite thereto. The wording "the thickness ratio between the resin layer having the composition A and the resin layer having the composition B which are adjacent to each other" means the following: about the resin layer having the composition A and the resin layer having the composition B which are present adjacently to each other in the laminated film, (the thickness of the resin layer having the composition A)/(the thickness of the resin layer having the composition B). In this case, it is indispensable that the resin layer having the composition A is nearer to predetermined one out of the surfaces than the resin layer having the composition B. It is allowable that a third or fourth layer made of a resin having a composition other than the composition A and the composition B is present. When the laminated film has such a layer structure, wherein the thickness ratio between the resin layer having the composition A and the resin layer having the composition B which are adjacent to each other increases or decreases from the side of the surface of the laminated film toward the side of the other surface opposite thereto, the refractive index distribution is easily controlled. In the conventional laminated films, the thickness ratio between adjacent layers is substantially constant; accordingly, the refractive index distribution cannot be controlled.

It is also preferred that the laminated film of the invention comprises the resin layers having the composition A, and resin layers having the composition B out of the resin layers; and has a layer structure wherein the thicknesses of the resin layers having the composition A increase from the side of the surface of the laminated film toward the side of the other surface opposite thereto, and thicknesses of the resin layers having the composition B decrease from the side of the surface of the laminated film toward the side of the other surface opposite thereto. In such a manner, a change in the refractive index is easily made larger so that the numerical aperture also is easily made large.

It is more preferred that the laminated film contains at least a layer structure wherein the thicknesses of the layers increase or decrease as in the following cases when the b, d, f, h and j layers in the above-mentioned examples have the same composition B: a case where the thicknesses of the layers has a relationship of (the thickness of the a layer < that of the c layer < that of the e layer < that of the g layer < that of the i layer) and further a relationship of (the thickness of the b layer > that of the d layer > that of the f layer > that of the h layer > that of the j layer); and a case where the thicknesses of the layers has a relationship of (the thickness of the a layer > that of the c layer > that of the e layer > that of the g layer > that of the i layer) and further a relationship of (the thickness of the b layer < that of the d layer < that of the f layer < that of the h layer < that of the j layer).

It is more preferred that the thicknesses of the resin layers having the composition B increase or decrease from the side of the surface of the laminated film toward the center in the layer-laminated direction; the thicknesses also increases or decreases from the side of the other surface toward the center in the layer-laminated direction; and the distribution of the thicknesses is like a quadratic function.

However, it is unnecessary that all the layers constituting the laminated film have the thickness change as described above, and the arrangement order of the layers having the changed thicknesses is not particularly limited, either.

In the laminated film of the invention, it is preferred that its layer structure contains a pair of adjacent ones out of the layers wherein the ratio between the thicknesses of the adjacent layers (the thickness of the thin layer/that of the thick layer) is 0.8 or more and 1.0 or less, and a pair of adjacent ones out of the layers wherein the ratio between the thicknesses of the adjacent layers is 0.01 or more and 0.5 or less. The wording "adjacent ones out of the layers" means a combination of adjacent ones out of the layers, and resins constituting the adjacent layers are preferably layers made of different layers. More preferably, the layer structure contains a pair of adjacent ones out of the layers wherein the ratio is 0.9 or more and 1.0 or less, and a pair of adjacent ones out of the layers wherein the ratio is 0.01 or more and 0.3 or less. In the case that a pair of layers having such a large change is present, a refractive index change in the film becomes large so that the numerical aperture can be made large or a scope in which an optical path is controlled is widened. Thus, the case is preferred.

The laminated film of the invention preferably has a maximum light ray reflectivity of 25% or less to light from the direction perpendicular to the film surfaces in a wavelength range of 400 to 2500 nm. The laminated film more preferably has a maximum light ray reflectivity of 15% or less. In the case that the maximum light ray reflectivity is 25% or less, optical loss is restrained in the case of controlling the optical path of light used ordinarily as an optical waveguide. Thus, this case is preferred.

It is preferred for the laminated film of the invention that the above-mentioned lamination structure is rendered a core and further a clad is set thereto. The refractive index of the clad is preferably not more than the refractive index of the core. A resin coat, which will be a protective layer, may be formed on the surface of the clad. It is more preferred that a known end-face treatment or end-face working is subjected thereto in order to be an incident light into the optical waveguide.

The laminated film of the invention is suitable as the core of a GI type optical waveguide. When the laminated film is rendered a GI type optical waveguide, it is more preferred that the refractive index distribution inside a cross section of the laminated film which will be the core substantially satisfies a quadratic distribution as represented by the following expression:

$$n^2(x)=n^2(0)(1-(gx)^2)$$

wherein x is the following distance: when the position of the center in the film thickness direction of the above-mentioned lamination structure which will be the core is rely 0, the distance in the thickness direction. The distance x up to one of the topmost surfaces therefrom in the film having a thickness of 2a is a or −a. Furthermore, n(x) is the refractive index at the position x, and g is a convergence constant obtained from the following expression:

$$g=(2\times\Delta/a)^{1/2}, \text{ and}$$

$$\Delta=(n(0)^2\times n2^2)/(2\times n(0)^2)$$

wherein n2 is the following refractive index: when a clad is formed, the refractive index of the clad. When the refractive index distribution becomes a quadratic distribution in this way, mode distribution is substantially lost so that the optical waveguide becomes one capable of coping with broad band transmission or high-speed transmission. Even if the optical waveguide is curved, the optical waveguide produces a difference in transmission time at less ease and also gives a smaller loss than SI type optical waveguides. As a result, the optical waveguide becomes suitable as a sheet-form communication cable which is flexibly used and is good for high-speed communication.

In order to attain such a refractive index distribution, it is preferred that the thicknesses of the resin layers having the composition A increase or decrease from the side of the surface of the laminated film toward the center in the layer-laminated direction; the thicknesses also increase or decrease from the side of the other surface toward the center in the layer-laminated direction; and the distribution of the thicknesses is like a quadratic function. It is more preferred that the thicknesses of the resin layers having the composition A increase or decrease from the side of the surface of the laminated film toward the center in the layer-laminated direction; the thicknesses also increase or decrease from the side of the other surface toward the center in the layer-laminated direction; the thicknesses of the resin layers having the composition B increase or decrease from the side of the surface of the laminated film toward the center in the layer-laminated direction; the thicknesses also increase or decrease from the side of the other surface toward the center in the layer-laminated direction; and the thickness distribution of the resin layers having one of the above-mentioned two compositions is like an upward convex quadratic function and the thickness distribution of the resin layers having the other is like a downward convex quadratic function.

The following will describe a preferred example of a process for producing the laminated film of the invention.

First, a resin having the composition A and a resin having the composition B are each prepared in the form of pellets or the like. It is preferred that polymerization therefor and film-formation therefrom are continuously performed. In this case, alien substances are less produced so as to give only a low loss. The pellets are beforehand dried in hot wind or vacuum if necessary, and then supplied into an extruder. The resins are each heated up to the melting point thereof or higher in the extruder, and the amount of the extruded resin is made even with a gear pump or the like. Alien substances and any denatured resin are then filtrated off therefrom through a filter or the like. Furthermore, the resin is molded into a target shape by means of a die, and then discharged out.

As a method for yielding the laminated film of the invention, there can be used a method of using a multi-manifold die, a feed block, a static mixer or the like to laminate the resins, which is forwarded from different flow channels by use of two or more extruders, into a multilayered form, or some other method. These may be arbitrarily combined with each other. In order to obtain the effects of the invention effectively, preferred is the multi-manifold die or feed block capable of controlling the layer thicknesses of the respective layers independently. In order to control the thicknesses of the respective layers with a high precision, it is particularly preferred to use a feed block including a member having a large number of fine slits made with a working tolerance of 0.1 mm or less. When the gap in each of the fine slits or the length thereof is adjusted, each of the layers can be controlled into a desired thickness.

Furthermore, in order to form an aspect wherein the number of the layers is 200 or more, which is a more preferred aspect of the invention, it is preferred to use a feed block which separately contains two or more members having a large number of fine slits (FIGS. 1 to 4).

FIG. 1 is a view illustrating a section for forming a lamination from the resins A and B supplied separately in the feed block (the section being referred to as a "laminating device"). In FIG. 1, members 1 to 9 are stacked in this order so as to form the laminating device 10.

The laminating device in FIG. 1 has four resin introducing ports originating from resin introducing members 2, 4, 6 and 8. For example, the resin A is supplied from the introducing ports 11 in the resin introducing members 2 and 6, and the resin B is supplied from the introducing ports 11 in the resin introducing members 4 and 8.

As a result, the slit member 3 receives the supply of the resin A from the resin introducing member 2 and that of the resin B from the resin introducing member 4, the slit member 5 receives the supply of the resin A from the resin introducing member 6 and that of the resin B from the resin introducing member 4, and the slit member 7 receives the supply of the resin A from the resin introducing member 6 and that of the resin B from the resin introducing member 8.

The kinds of the resins introduced into the respective slits are decided in accordance with the positional relationship between the bottom faces of liquid-storing sections 12 in the resin introducing members 2, 4, 6 and 8 and ends of the respective slits in the slit members. Specifically, as illustrated in FIG. 3, a ridge line 13 of the top of each of the slits in the slit members has an inclination to the thickness direction of the slit members (FIGS. 2(b) and (c)). The heights of the bottom faces of the liquid-storing sections 12 in the resin introducing members 2, 4, 6 and 8 are positioned between an upper end 14 of the ridge line 13 and a lower end 15 thereof. According to this matter, from the side where the ridge line 13 is directed upward, either of the resins is introduced from the liquid-storing sections 12 in the resin introducing members 2, 4, 6 and 8 (16 in FIG. 3), but from the side where the ridge line 13 is directed downward, no resin is introduced since the slits are blocked. Thus, the resin A or B is selectively introduced into each of the slits. Accordingly, resin flows having a lamination structure are formed in the slit members 3, 5 and 7, and flow out from outflow ports 17 in the lower portions of the members 3, 5 and 7.

About the shapes of the slits, it is preferred that the slit area of the side where either of the resins is introduced is not equal to the slit area of the side where no resin is introduced. The percentage of (the slit area of the side where no resin is introduced) to (that of the side where either of the resins is introduced) is preferably 20% or more, and is preferably 90% or less, more preferably 50% or less. The pressure loss inside the feed block is preferably 1 MPa or more. The slit length (longer one out of the slit lengths in the Z direction in FIG. 1) is preferably set into 100 mm or more.

It is also preferred that the feed block has therein a manifold corresponding to each of the slits. By action of the manifold, the flow rate distribution in the width direction (the Y direction in FIG. 1) inside the slit is made even, and thus the lamination ratio in the width direction in the laminated film can be made even. Thus, even about the film having a large area, the refractive index distribution thereof can be controlled.

The outflow ports 17 in the lower portions of the slit members 3, 5 and 7 are positioned to have a positional relationship for making laminated structures of the resin flows from the three parallel to each other, and partitioned off from each other with the resin introducing members 4 and 6 (19L, 20L and 21L in FIG. 4). Thus, by means of a junction device 18 as illustrated in FIG. 4, the arrangement thereof is converted by the regulation of flow channels as shown from line L-L' to line M-M' (19M, 20M and 21M in FIG. 4). The laminated structures of the three resin flows also become series. The width of the resin flows is enlarged over a range from line M-M' to line N-N' in FIG. 4, and jointed downstream from line N-N' in FIG. 4.

In such a manner, very thin resin layers can be arbitrarily laminated with a high precision. In any conventional device, it is general to use the device together with a square mixer in order to attain the lamination of 200 to 300 layers. However, in such a way, laminated flows are deformed or laminated in a similar form; therefore, it is impossible to adjust the thickness of any layer as described above.

Additionally, the use of a feed block as described above causes the device not to be made extremely large-sized, and thus alien substances based on thermal deterioration are less generated. Even if the number of laminated layers is extremely large, the lamination can be attained with a high precision.

About the inner wall of the feed block, the surface roughness of the inner wall is preferably set to 0.4 S or less. Moreover, it is advisable to set the contact angle thereof to water into 30° or more at room temperature.

It is also preferred to adopt, as the method for heating the feed block, a method of circulating a heating medium in order to decrease the unevenness of the resin temperature.

The die for molding the lamination of the resin layers, which is formed inside the feed block, is preferably a die in which the width-enlarging ratio of the lamination is from 1 to 100 times (inclusive), more preferably a die in which the ratio is 50 times or less. When the width-enlarging ratio is set to 100 times or less, a disturbance of the lamination thickness of the surface layer portion of the lamination can be suppressed.

The sheet having the lamination structure discharged from the die is pushed out onto a coolant such as a casting drum, and then rapidly cooled and solidified so as to be made into a casting film. At this time, it is preferred to adopt a method of using electrodes in a wire, tape, needle or knife form or in some other form to cause the sheet to adhere onto the coolant, such as the casting drum, by electrostatic force, thereby cooling and solidifying the sheet rapidly, a method of blowing out air from a slit-, spot-, or plane-form device to cause the sheet to adhere onto the coolant, such as the casting drum, thereby cooling and solidifying the sheet rapidly, a method of causing the sheet onto the coolant with nip rolls, thereby cooling and solidifying the sheet rapidly, or some other method.

In order to make the loss of optical transmission lower, the laminated film of the invention is more preferably a non-drawn film. If necessary, the laminated film may be a drawn film obtained by subjecting a non-drawn film to monoaxial drawing or biaxial drawing. The monoaxial drawing is drawing in the machine direction or in the transverse direction, and the biaxial direction is drawing in the machine direction and in the transverse directions. The biaxial drawing may be successive drawing in the two directions, or simultaneous drawing in the two direction. It is allowable to draw the sheet in the two directions and subsequently draw the sheet again in the machine direction and/or the transverse direction.

The drawing in the machine direction can be attained on the basis of, for example, a rotaion velocity difference between rolls. This drawing may be performed at a single stage, or may be performed at a multistage wherein plural rolls are used. The draw ratio in the machine direction is varied in accordance with the kind of the resin, and is usually from 2 to 15 times. In the case that a half or more of the amount of the resin constituting the laminated film is made of polyethylene terephthalate, the draw ratio is in particular preferably from 2 to 7 times. The draw temperature is preferably not lower than the glass transition temperature of the resin constituting the laminated film and not higher than the glass transition temperature+100° C. The drawing in the machine direction may be attained by using a tenter to grasp both ends of the film with its clips, and then widening the interval between the clips while transporting the film in the machine direction.

The film monoaxially-drawn in the machine direction may be subjected to a surface treatment such as corona treatment, flame treatment or plasma treatment in accordance with the usage thereof, and then an easily-sliding property, an easily-adhesive property, an antistatic property or some other function may be given thereto by in-line coating.

The drawing in the transverse direction may be attained by using a tenter to grasp both ends of the film with its clips, and then widening the interval between the grasped points while transporting the film in the machine direction. The draw ratio in the transverse direction is varied in accordance with the kind of the resin constituting the laminated film. Usually, the ratio is preferably from 2 to 15 times. In the case that a half or more of the amount of the resin constituting the laminated film is made of polyethylene terephthalate, the draw ratio is in particular preferably from 2 to 7 times. The draw temperature is preferably not lower than the glass transition temperature of the resin constituting the laminated film and not higher than the glass transition temperature+120° C.

In order to give flatness or dimension stability to the film biaxially-drawn in this way, it is preferred to subject the film to thermal treatment at a temperature from the drawn temperature to the melting point (inclusive) inside the tenter. After the film is thermally treated in this way, the film is slowly and homogeneously cooled and then cooled to room temperature. The film is then wound up. If necessary, the film may be subjected to relaxing treatment or the like at a time from the thermal treatment to the slow cooling.

EXAMPLES

The following will describe methods used in the invention in order to evaluate physical property values.

(1) Intrinsic Viscosity

An Ostwald viscometer was used to measure the viscosity of a solution at 25° C. in o-chlorophenol. The intrinsic viscosity was calculated from the solution viscosity. The unit of the intrinsic viscosity is represented by [dL/g]. The number of n was set to 3, and then the average thereof was adopted.

(2) Refractive Index of Resin

About any non-drawn film, the refractive index of a resin having the same composition as the resin supplied for the structure of the laminated film was measured in accordance with the A method of JIS K 7142 (1996).

About any laminated film subjected to drawing/thermal treatment or some other treatment, only the resin therefor, which was to be evaluated, was made into a film for evaluation under the same conditions, examples thereof including the total thickness of the film, and drawing/thermal treatment. The refractive index nz in the thickness direction of the film for evaluation was measured in accordance with the A method of JIS K 7142 (1996), and evaluated.

(3) Layer Thickness, and the Number of Laminated Layers

The layer structure of any film was examined by observing a sample gained therefrom by cutting its cross section with a microtome through a microscope. Specifically, a transmission electron microscope HU-12 model (manufactured by Hitachi Ltd.) was used to observe an enlarged cross section of the film at a magnification power of 3000 to 200000. The cross section was photographed. From the photograph of the cross section, the thicknesses of layers therein and the number of the laminated layers were measured. In order to make the layer structure clear, the layers were dyed by a $RuO_4$ dyeing method, so that different ones out of the layers were divided by the dyeing.

(4) Maximum Light Ray Reflectivity

A 60-diameter integrating sphere 130-0632 (Hitachi Ltd.) and a 10°-inclined spacer were attached to a spectrophotometer (U-3410, Spectrophotometer) manufactured by Hitachi Ltd., so as to measure the reflectivity using unpolarized light. The sample was set to make the longitudinal direction thereof consistent with the up-and-down direction. Its band parameter was set to 2/servo, and its gain was set to 3. In the range of 400 to 2500 nm, the reflectivity was measured at a detecting rate of 120 nm/min. In order to normalize the reflectivity, accessory $Al_2O_3$ was used as a standard reflecting plate. The highest reflectivity in the wavelength range of 400 to 2500 nm was decided as the maximum light ray reflectivity.

(5) Refractive Index Distribution

Any film sample was put into a gelatin capsule, and then an epoxy resin (manufactured by Bueler Co.) was cast thereinto. The resultant was allowed to stand still for 24 hours. Next, the epoxy resin with which the film was encapsulated was shaved with a single edge to make the tip of the film sample naked. Thereafter, a diamond knife was fitted to a microtome (ULTRACUT UCT, manufactured by Leica Co.), and the edge of the knife was adjusted to make the edge perpendicular to the surface direction of the film. The sample was gradually shaved off from the tip so as to produce a smooth cross section (thickness direction–width direction cross section) of the sample. At this time, if it was demonstrated with a stereoscopic microscope that injuries or defects were generated in the surface, the film was further shaved until a face wherein no injures or defects were observed made its appearance.

About the resultant sample, the refractive index distribution in the cross section of the laminated film was measured by a beam profile reflectivity measuring method. Conditions for the measurement are described below.

Apparatus: high-precision film thickness meter, Opti-Probe 2000, manufactured by Therma-Wave, Inc.

Measuring wavelength: 675 nm

Beam spot: 1 μm

Stage precision: ±0.2 μm

Detector: array detector

Measurement: the distribution of the refractive index nz in the thickness direction was measured by line measurement.

(6) Heat Example/Humidity Resistance

Any sample was stored in a 60° C./90% RH atmosphere for 250 hours for wet heat treatment. Subsequently, the sample was stored at 60° C. in a vacuum for 24 hours. Before and after the wet heat treatment, the sampling and the refractive index distribution measurement in the above-mentioned (5) were conducted. From the difference d0 between the maximum refractive index and the minimum refractive index in the refractive index distribution before the wet heat treatment, and the difference d1 between the maximum refractive index and the minimum refractive index in the refractive index distribution after the wet heat treatment, d (=|d0−d1|) was obtained. A case where d was 0.02 or more was judged to be bad (x), and a case where d was less than 0.02 was judged to be good (o).

Example 1

As two thermoplastic resins, the following were used: a thermoplastic resin X: a methacrylic resin (PMMA)

[ACRYPET VH [transliteration], manufactured by Mitsubishi Rayon Co., Ltd.], and a thermoplastic resin Y: a polycarbonate (PC)

[S-2000, manufactured by Mitsubishi Engineering Plastics Corp.]

These thermoplastic resins X and Y were each dried, and then the resins were separately supplied into extruders and made into a melted state at 230° C.

The melted thermoplastic resins X and Y were each passed through a gear pump and a filter, and then the resins were supplied into a feed block for the lamination of 3001 layers, as illustrated in FIG. 1. The thermoplastic resins X and Y were made into a structure wherein: the thicknesses of layers made thereof changed gradually from the sides of the surfaces toward the side of the center; and the thermoplastic resin X layers, the number of which was 1501, and the thermoplastic resin Y layers, the number of which was 1500, were alternately laminated in the thickness direction (the layers of the two surfaces were made of the thermoplastic resin X). The thickness of each of the layers was adjusted by the shapes of fine slits in the feed block. The injecting amounts of the thermoplastic resins X and Y were adjusted so as to set the lamination ratio (=the ratio by weight) in the whole as follows: X/Y=1.

The thus formed lamination, which was composed of the 3001 layers, was supplied into a T die, and molded into a sheet form. Thereafter, the sheet was rapidly cooled and solidified onto a casting drum, the surface temperature of which was kept at 20° C., by means of nip rolls.

The thickness of the resultant film was 45 μm.

In the two surface portions of the resultant film, the thicknesses of the thermoplastic resin X layers were each 27 nm, and those of the thermoplastic resin Y layers were each 3 nm. In the central portion thereof, the thickness of the thermoplastic resin X layer was 3 nm, and that of the thermoplastic resin Y layer was 27 nm. The thicknesses of the thermoplastic resin X layers decreased in the form of a liner function from 27 to 3 nm from the surface portions toward the central portion while the thicknesses of the thermoplastic resin Y layers increased in the form of a liner function from 3 to 27 nm from the surface portions toward the central portion.

The refractive index distribution thereof was not any square distribution, and was a middle distribution between SI and GI types (called a pseudo-GI type).

The obtained results are shown in Table 1.

Example 2

A laminated film was produced in the same way as in Example 1 except that the shapes of the fine slits in the feed block were changed and the injected amounts of the thermoplastic resins X and Y were adjusted so as to set the lamination ratio (=the ratio by weight) in the whole as follows: X/Y=1.5.

The thickness of the resultant film was 45 μm.

In the two surface portions of the resultant film, the thicknesses of the thermoplastic resin X layers were each 27 nm, and those of the thermoplastic resin Y layers were each 3 nm. In the central portion thereof, the thickness of the thermoplastic resin X layer was 3 nm, and that of the thermoplastic resin Y layer was 27 nm. The thicknesses of the thermoplastic resin X layers decreased from 27 to 3 nm from the surface portions toward the central portion while the thicknesses of the thermoplastic resin Y layers increased from 3 to 27 nm from the surface portions toward the central portion. The thickness distribution of the thermoplastic resin X layers was a quadratic function distribution wherein the film central portion was the thinnest, and the thickness distribution of the thermoplastic resin Y layers was a quadratic function distribution wherein the film central portion was the thickest.

The refractive index distribution was a square distribution, and was of a GI type.

The obtained results are shown in Table 1.

Example 3

The two surfaces of the film of Example 2 were coated with an amorphous fluorine-contained resin (refractive index: 1.34) manufactured by Asahi Glass Co., Ltd. as clads, and then the resin was dried. The thickness of the resultant film was 49 μm.

Example 4

A laminated film was produced in the same way as in Example 1 except that the shapes of the fine slits in the feed block were changed and further the lamination ratio in the whole and the injected amount of the thermoplastic resin Y were changed so as to make each of the thermoplastic resin Y layers into a constant thickness of 20 nm.

The thickness of the resultant film was 53 μm.

The refractive index distribution was of a pseudo-GI type.

The obtained results are shown in Table 1.

Example 5

As two thermoplastic resins, the following were used:

a thermoplastic resin X: a polyethylene terephthalate (PET) intrinsic viscosity: 0.65, and a thermoplastic resin Y: an ethylene terephthalate polycondensate copolymerized with 30% by mol of cyclohexanedimethanol (PETG)

[PETG 6763, manufactured by Eastman Chemical Company.]

These thermoplastic resins X and Y were each dried, and then the resins were separately supplied into extruders and made into a melted state at 280° C.

The melted thermoplastic resins X and Y were each passed through a gear pump and a filter, and then the resins were supplied into a feed block for the lamination of 201 layers, as illustrated in FIG. 1. The thermoplastic resins X and Y were made into a structure wherein: the thicknesses of layers made thereof changed gradually from the sides of the surfaces toward the side of the center; and the thermoplastic resin X layers, the number of which was 101, and the thermoplastic resin Y layers, the number of which was 100, were alternately laminated in the thickness direction (the layers of the two surfaces were made of the thermoplastic resin X). The thickness of each of the layers was adjusted by the shapes of fine slits in the feed block. The injecting amounts of the thermoplastic resins X and Y were adjusted so as to set the lamination ratio (=the ratio by weight) in the whole as follows: X/Y=0.67

The thus formed lamination, which was composed of the 201 layers, was supplied into a T die, and molded into a sheet form. Thereafter, the sheet was rapidly cooled and solidified onto a casting drum, the surface temperature of which was kept at 25° C., by the application of static electricity thereto.

This cast film was heated with a group of rolls, the temperature of which was set to 90° C., and drawn 3.3 times in the machine direction. Next, this monoaxially drawn film was once introduced into a tenter without being wound, preheated with hot wind of 90° C. temperature, and drawn 3.3 times in the transverse direction. Subsequently, the drawn film was subjected to thermal treatment with hot wind of 235° C. temperature followed by 5% relaxing treatment. The resultant was gradually cooled to room temperature, and wound.

The thickness of the resultant film was 11 μm.

In the two surface portions of the resultant film, the thicknesses of the thermoplastic resin X layers were each 100 nm, and those of the thermoplastic resin Y layers were each 10 nm. In the central portion thereof, the thickness of the thermoplastic resin X layer was 10 nm, and that of the thermoplastic resin Y was 100 nm. The thicknesses of the thermoplastic resin X layers decreased from 100 to 10 nm from the surface portions toward the central portion while the thicknesses of the thermoplastic resin Y layers increased from 10 to 100 nm from the surface portions toward the central portion.

The thickness distribution of the thermoplastic resin X layers was a quadratic function distribution wherein the film central portion was the thinnest, and the thickness distribution of the thermoplastic resin Y layers was a quadratic function distribution wherein the film central portion was the thickest.

About the refractive index nz in the thickness direction, the distribution thereof was a square distribution, and thus the film became a GI type optical waveguide. However, about the refractive index ny in the transverse direction, the distribution thereof was a distribution wherein the refractive index of the central portion was lower than that of the vicinity of the surface layer since birefringence was generated by the biaxial drawing.

The obtained results are shown in Table 1.

Example 6

As the thermoplastic resins X and Y, the same resins as used in Example 1 were used.

These thermoplastic resins X and Y were each dried, and then the resins were separately supplied into extruders and made into a melted state at 230° C.

The melted thermoplastic resins X and Y were each passed through a gear pump and a filter, and then the resins were supplied into a feed block for the lamination of 11 layers. The thermoplastic resins X and Y were made into a structure wherein: the thicknesses of layers made thereof changed gradually from the sides of the surfaces toward the side of the center; and the thermoplastic resin X layers, the number of which was 6, and the thermoplastic resin Y layers, the number of which was 5, were alternately laminated in the thickness direction (the layers of the two surfaces were made of the thermoplastic resin X). The thickness of each of the layers was adjusted by the shapes of fine slits in the feed block.

The thus formed lamination, which was composed of the 11 layers, was supplied into a T die, and molded into a sheet form. Thereafter, the sheet was rapidly cooled and solidified onto a casting drum, the surface temperature of which was kept at 20° C., by means of nip rolls.

The thickness of the resultant film was 10 μm.

The thicknesses of the layers of the resultant laminated film, which were arranged in the order of resin X/resin Y/ . . . /resin Y/resin X from one of its surface layers to the other opposite thereto, were as follows: 40 nm/1 nm/20 nm/30 nm/10 nm/9000 nm/10 nm/30 nm/20 nm/10 nm/40 nm.

The refractive index distribution was not any square distribution, and was of a pseudo-GI type.

The obtained results are shown in Table 1.

Example 7

As two thermoplastic resins, the following were used:

a thermoplastic resin X: a resin composed of:

20% by weight of polyethylene terephthalate (PET) having an intrinsic viscosity of 0.65, and 80% by weight of polyethylene naphthalate (PEN) having an intrinsic viscosity of 0.62; and a thermoplastic resin Y: a resin composed of:

90% by weight of PET having an intrinsic viscosity of 0.65, and

10% by weight of PEN having an intrinsic viscosity of 0.62.

These thermoplastic resins X and Y were each dried, and then the resins were separately supplied into extruders and made into a melted state at 290° C.

The melted thermoplastic resins X and Y were each passed through a gear pump and a filter, and then the resins were supplied into a feed block for the lamination of 801 layers, as illustrated in FIG. 1. The thermoplastic resins X and Y were made into a structure wherein: the thicknesses of layers made thereof changed gradually from the sides of the surfaces toward the side of the center; and the thermoplastic resin X layers, the number of which was 401, and the thermoplastic resin Y layers, the number of which was 400, were alternately laminated in the thickness direction (the layers of the two surfaces were made of the thermoplastic resin X). The thickness of each of the layers was adjusted by the shapes of fine slits in the feed block. The injecting amounts of the thermoplastic resins X and Y were adjusted so as to set the lamination ratio (=the ratio by weight) in the whole as follows: X/Y=1.5.

The thus formed lamination, which was composed of the 401 layers, was supplied into a T die, and molded into a sheet form. Thereafter, the sheet was rapidly cooled and solidified onto a casting drum, the surface temperature of which was kept at 25° C., by the application of static electricity thereto.

The thickness of the resultant film was 44 μm.

In the two surface portions of the resultant film, the thicknesses of the thermoplastic resin X layers were each 10 nm, and those of the thermoplastic resin Y layers were each 100 nm. In the central portion thereof, the thickness of the thermoplastic resin X layer was 100 nm, and that of the thermoplastic resin Y layer was 10 nm. The thicknesses of the thermoplastic resin X layers increased from 10 to 100 nm from the surface portions toward the central portion while the thicknesses of the thermoplastic resin Y layers decreased from 100 to 10 nm from the surface portions toward the central portion. The thickness distribution of the thermoplastic resin X layers was a quadratic function distribution wherein the film central portion was the thickest, and the thickness distribution of the thermoplastic resin Y layers was a quadratic function distribution wherein the film central portion was the thinnest.

The refractive index distribution was a square-distribution, and was of a GI type.

The obtained results are shown in Table 1.

Example 8

A laminated film was produced in the same way as in Example 7 except that the thickness of the film was set into 35 μm by adjusting the speed of the formation of the film.

In the two surface portions of the resultant film, the thicknesses of the thermoplastic resin X layers were each 8 nm, and those of the thermoplastic resin Y layers were each 80 nm. In the central portion thereof, the thickness of the thermoplastic resin X layer was 80 nm, and that of the thermoplastic resin Y layer was 8 nm. The thickness distribution of the thermoplastic resin X layers was a quadratic function distribution wherein the film central portion was the thickest, and the thickness distribution of the thermoplastic resin Y layers was a quadratic function distribution wherein the film central portion was the thinnest.

The refractive index distribution was a square distribution, and was of a GI type.

The obtained results are shown in Table 1.

The refractive index distribution of the resultant laminated film is shown in FIG. 5.

Comparative Example 1

A mono-layered film was produced in the same way as in Example 1 except the following:

As a thermoplastic resin which was a raw material for the mono-layered film, there was used:

thermoplastic resin X: a methacrylic resin (PMMA) [ACRYPET VH [transliteration], manufactured by Mitsubishi Rayon Co., Ltd.], and As a feed block therefor, a feed block for a mono-layered film was used.

The injected amount was changed.

The thickness of the resultant film was 100 μm.

The refractive index distribution was substantially uniform in the thickness direction. Therefore, the film was unsuitable for high-speed transmission.

The obtained results are shown in Table 2.

Comparative Example 2

A mono-layered film was produced in the same way as in Example 5 except the following:

As a thermoplastic resin which was a raw material for the mono-layered film, there was used:

thermoplastic resin X: polyethylene terephthalate (PET)) intrinsic viscosity: 0.65.

As a feed block therefor, a feed block for a mono-layered film was used.

The injected amount was changed.

The thickness of the resultant film was 100 μm.

The refractive index distribution was substantially uniform in the thickness direction. Therefore, the film was unsuitable for high-speed transmission.

The obtained results are shown in Table 2.

Comparative Example 3

A laminated film was produced in the same way as in Example 1 except the following:

As a feed block therefor, there was used a feed block, for the lamination of 1001 layers, in which in the lamination direction all of the shapes of slits were made equal to each other for common ones out of the components.

The thickness of the resultant film was 91 μm.

The thicknesses of the layers of the resultant laminated film were substantially uniform in the layer-laminated direction. The thicknesses of the thermoplastic resin X layers were each about 90 nm, and those of the thermoplastic resin Y layers were each about 90 nm.

The refractive index distribution was substantially uniform in the thickness direction. Therefore, the film was unsuitable for high-speed transmission.

The obtained results are shown in Table 2.

Comparative Example 4

A laminated film was produced in the same way as in Example 5 except that the adjustment of the shapes of the slits, the lamination ratio in the whole, and the injected amounts was changed.

The thickness of the resultant film was 26 μm.

In the two surface portions of the resultant film, the thicknesses of the thermoplastic resin X layers were each 150 nm, and those of the thermoplastic resin Y layers were each 110 nm. In the central portion thereof, the thickness of the thermoplastic resin X layer was 110 nm, and that of the thermoplastic resin Y layer was 150 nm. The thicknesses of the thermoplastic resin X layers decreased monotonously from 150 to 110 nm from the surface layer portions toward the central portion while the thicknesses of the thermoplastic resin Y layers increased monotonously from 110 to 150 nm from the surface layer portions toward the central portion. The thickness distribution of the thermoplastic resin X layers was a quadratic function distribution wherein the film central portion was the thinnest, and the thickness distribution of the thermoplastic resin Y layers was a quadratic function distribution wherein the film central portion was the thickest.

About the refractive index nz in the thickness direction, the distribution thereof was a square distribution, and thus the film became a GI type optical waveguide. However, about the evaluation of the maximum light ray reflectivity, the film had a high reflectivity near 850 nm, and thus the optical transmission loss at a wavelength of 830 nm was an extremely large value of 10 db/cm or more. Thus, the film was unsuitable as a practical optical waveguide.

The obtained results are shown in Table 2.

Comparative Example 5

A film wherein ethyl heptafluoro-n-butanoate was dispersed in a PMMA mono-layered film was produced in the same way as described in Example 1 of JP-A-2003-322742.

The thickness of the resultant film was 1 mm.

The refractive index distribution of the resultant film was a pseudo-GI type optical waveguide.

In the heat resistance/humidity resistance test, the refractive index distribution changed largely before and after the wet heat treatment. Thus, the film was unsuitable as a practical optical waveguide.

The obtained results are shown in Table 2.

INDUSTRIALLY APPLICABILITY

The laminated film of the invention can be used in various displays such as a liquid crystal display, a plasma display, an EL display and a projection screen; light energy devices such as a solar cell; optical lenses or light-introducing plates used in various optical instruments such as an optical printing machine or a camera; and various communication/circuit instruments such as an optical waveguide, a photomixing device or an optical shunt.

DESCRIPTION OF SYMBOLS

Figure 1:
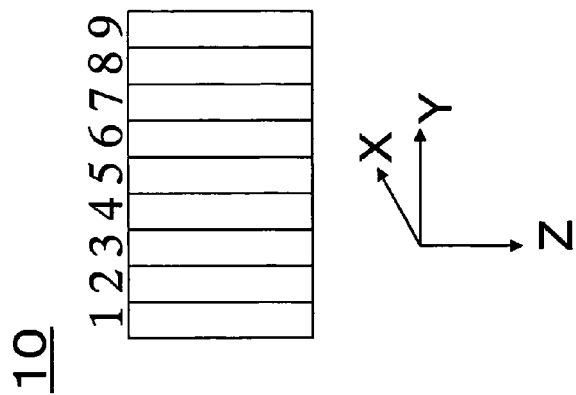
FIG. 1 is a view for explaining a laminating device section of a feed block suitable for producing a laminated film of the invention.
Figure 1:
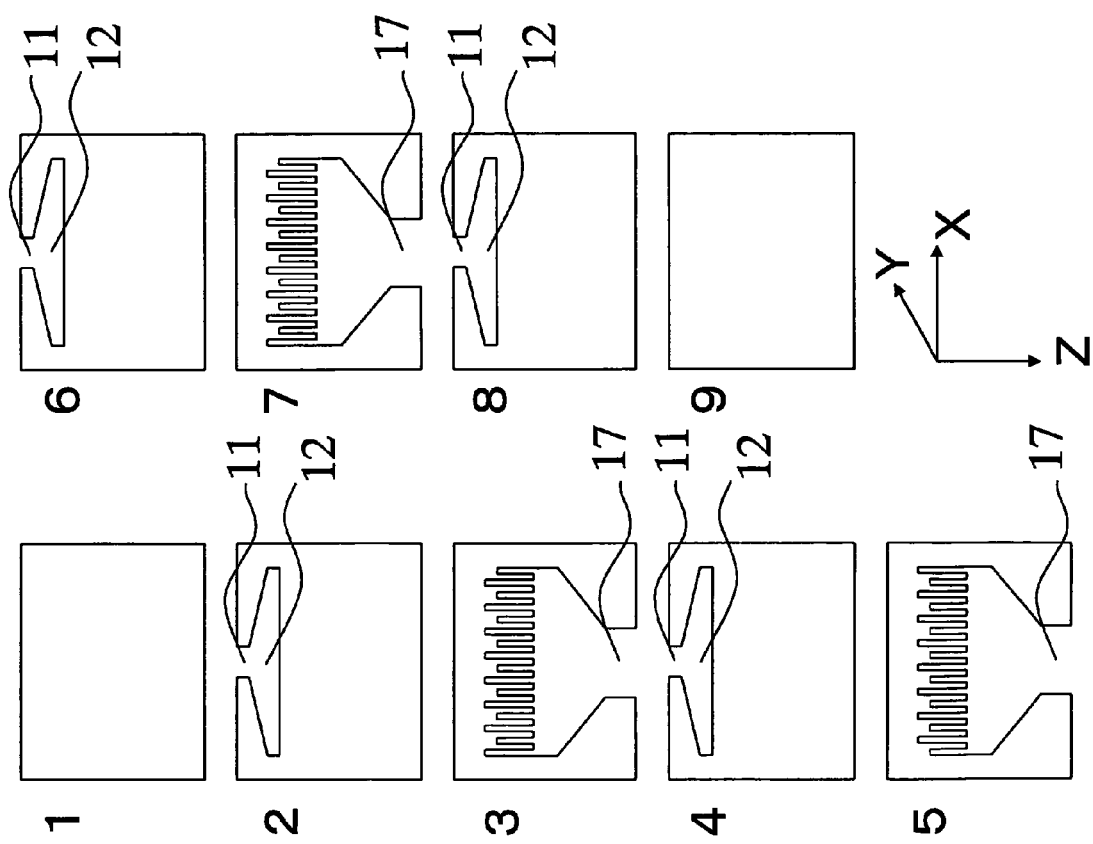
Figure 2:
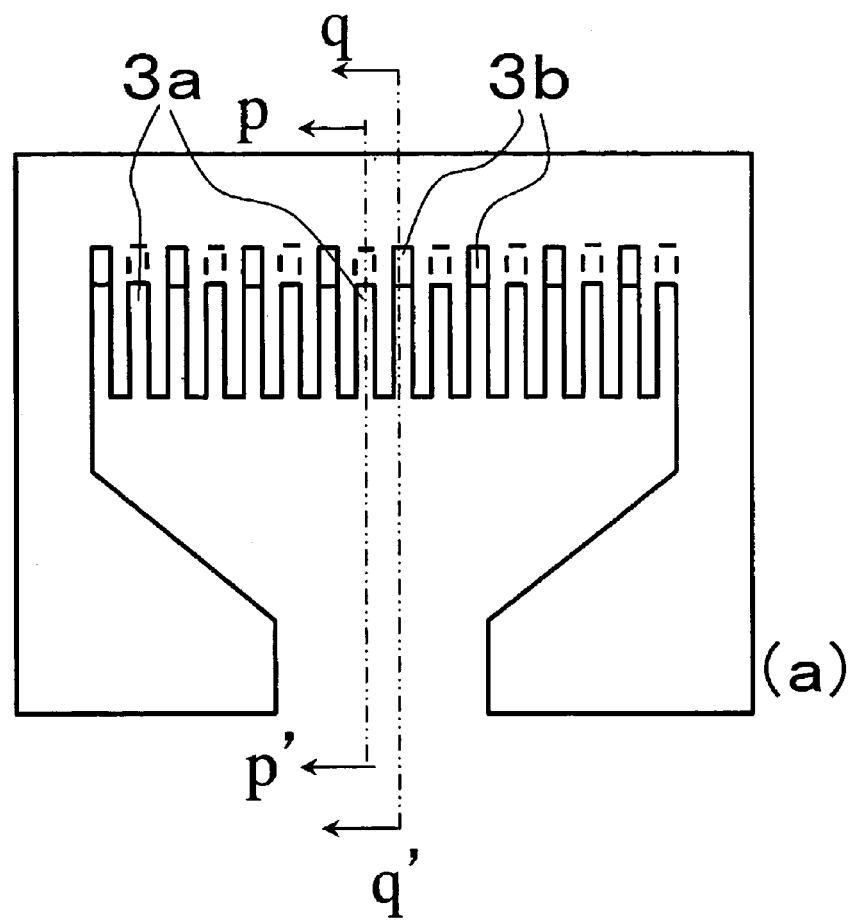
FIG. 2 are a front view and a sectional view of a slit member constituting the laminating device.
Figure 2:
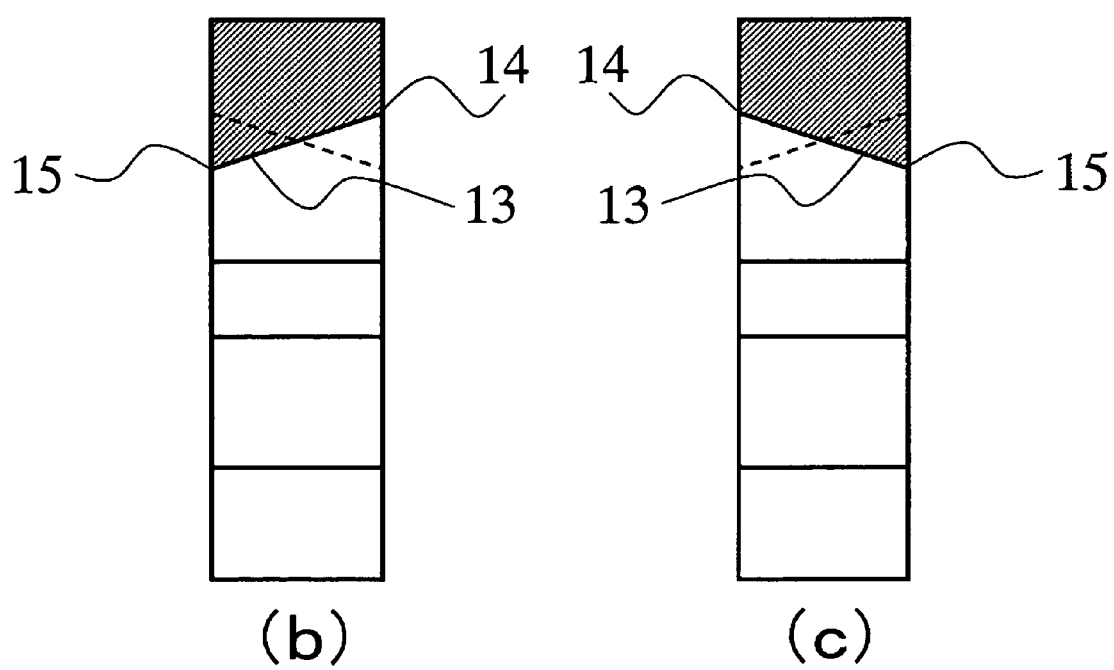
Figure 3:
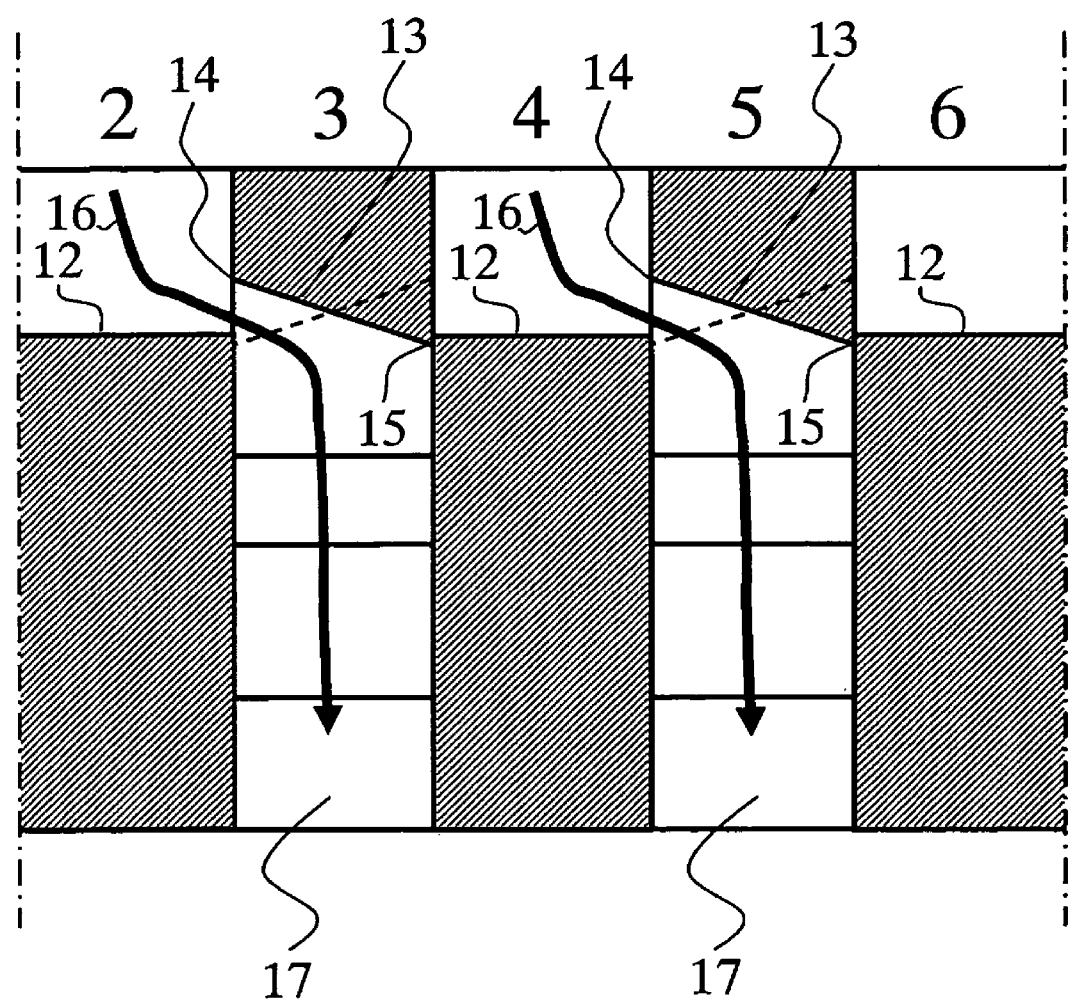
FIG. 3 is a sectional view showing a relationship between the internal structure of the laminating device and the flow of resin.
Figure 4:
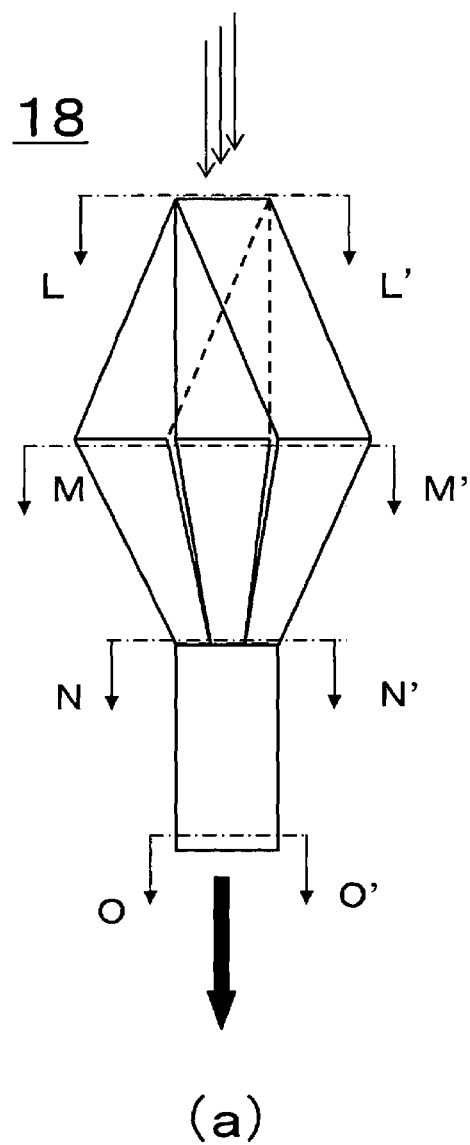
FIG. 4 are views for explaining a junction device section of the feed block.
Figure 4:
Figure 4:
Figure 4:
Figure 4:
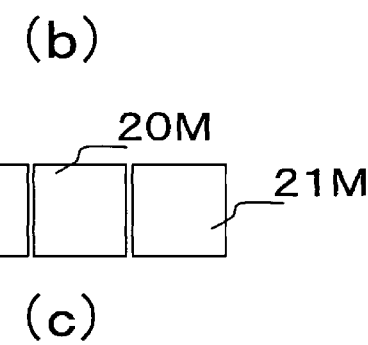
Figure 5:
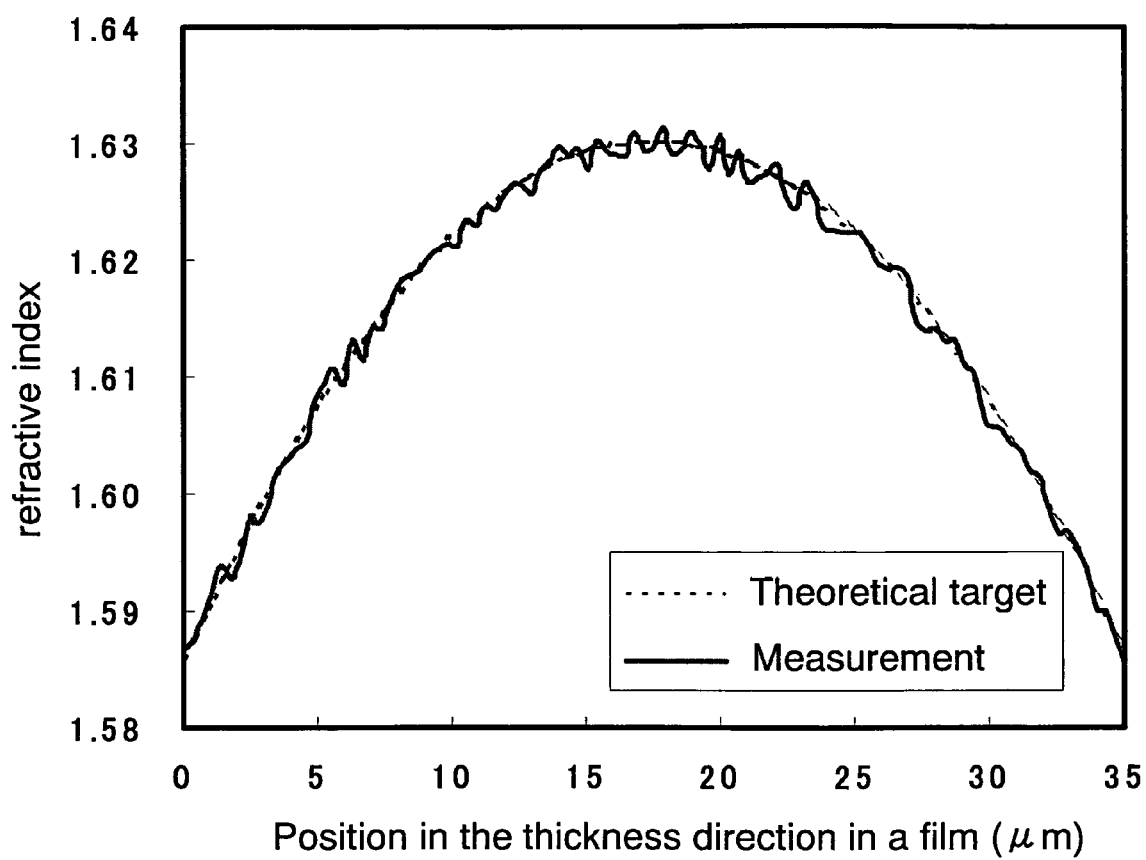
FIG. 5 is a GI type refractive index distribution graph of a laminated film of Example 8.

1, 9: side plates
2, 6: resin-introducing members (for a resin having a composition A)
4, 8: resin-introducing members (for a resin having a composition B)
3, 5, 7: slit members
3a, 3b: slits
10: laminating device
11: introducing port
12: liquid-storing section (or the bottom face thereof)
13: ridge line of the top of the slits
14: the upper end of the ridge line
15: the lower end of the ridge line
16: resin flow
17: outflow port of the laminating device
18: junction device
19 to 21: resin flow channel

TABLE 1

|  | Example 1 | Example 2 | Example 4 | Example 5 | Example 6 | Example 7 | Example 8 |
| --- | --- | --- | --- | --- | --- | --- | --- |
| Thermoplastic resin X | PMMA | PMMA | PMMA | PET | PMMA | PEN + PET | PEN + PET |
| Refractive index of the thermoplastic resin X | 1.49 | 1.49 | 1.49 | 1.5 | 1.49 | 1.64 | 1.64 |
| Thermoplastic resin Y | PC | PC | PC | PETG | PC | PET + PEN | PET + PEN |
| Refractive index of the thermoplastic resin Y | 1.59 | 1.59 | 1.59 | 1.58 | 1.59 | 1.58 | 1.58 |
| The number of laminated layers | 3001 | 3001 | 3001 | 201 | 11 | 801 | 801 |
| Change in the thicknesses of the thermoplastic resin X layers (two surface layer portions → central portion) | Decreased | Decreased | Decreased | Decreased | Decreased | Increased | Increased |
| The layer thickness of the thermoplastic resin X in the surface layer portions (nm) | 27 | 27 | 27 | 100 | 40 | 10 | 8 |
| The layer thickness of the thermoplastic resin X in the central portion of (nm) | 3 | 3 | 3 | 10 | 10 | 100 | 80 |
| Change in the thicknesses of the thermoplastic resin Y layers (two surface layer portions → central portion) | Increased | Increased | Constant | Increased | Increased | Decreased | Decreased |
| The layer thickness of the thermoplastic resin Y in the surface layer portions (nm) | 3 | 3 | 20 | 10 | 10 | 100 | 80 |
| The layer thickness of the thermoplastic resin Y in the central portion (nm) | 27 | 27 | 20 | 100 | 9000 | 10 | 8 |
| Thickness ratio between adjacent layers (maximum value) | 1 | 1 | 1 | 1 | 0.67 | 1 | 1 |
| Thickness ratio between adjacent layers (minimum value) | 0.1 | 0.1 | 0.15 | 0.1 | 0.001 | 0.1 | 0.1 |
| Film thickness (μm) | 45 | 45 | 53 | 11 | 10 | 44 | 35 |
| Maximum light ray reflectivity | 9 | 9 | 9 | 15 | 11 | 12 | 12 |
| Heat resistance/humidity resistance | ○ | ○ | ○ | ○ | ○ | ○ | ○ |
| Refractive index distribution | Pseudo-GI type | GI type | Pseudo-GI type | GI type | Pseudo-GI type | GI type | GI type |

TABLE 2

|  | Comparative Example 1 | Comparative Example 2 | Comparative Example 3 | Comparative Example 4 | Comparative Example 5 |
|---|---|---|---|---|---|
| Thermoplastic resin X | PMMA | PET | PMMA | PET | PMMA |
| Refractive index of the thermoplastic resin X | 1.49 | 1.65 | 1.49 | 1.5 | 1.49 |
| Thermoplastic resin Y | — | — | PC | PETG | — |
| Refractive index of the thermoplastic resin Y | — | — | 1.59 | 1.58 | — |
| The number of laminated layers | 1 | 1 | 1001 | 201 | 1 |
| Change in the thicknesses of the thermoplastic resin X layers (two surface layer portions → central portion) | — | — | Constant | Decreased | — |
| The layer thickness of the thermoplastic resin X in the surface layer portions (nm) | — | — | 90 | 150 | — |
| The layer thickness of the thermoplastic resin X in the central portion of (nm) | — | — | 90 | 110 | — |
| Change in the thicknesses of the thermoplastic resin Y layers (two surface layer portions → central portion) | — | — | Constant | Increased | — |
| The layer thickness of the thermoplastic resin Y in the surface layer portions (nm) | — | — | 90 | 110 | — |
| The layer thickness of the thermoplastic resin Y in the central portion (nm) | — | — | 90 | 150 | — |
| Thickness ratio between adjacent layers (maximum value) | — | — | 1 | 1 | — |
| Thickness ratio between adjacent layers (minimum value) | — | — | 1 | 0.73 | — |
| Film thickness (mm) | 100 | 100 | 91 | 26 | 1000 |
| Maximum light ray reflectivity | 9 | 12 | 95 | 85 | 9 |
| Heat resistance/humidity resistance | ○ | ○ | ○ | ○ | x |
| Refractive index distribution | SI type | SI type | SI type | GI type | Pseudo-GI type |

The invention claimed is:

1. A laminated film, comprising 5 or more laminated resin layers consisting essentially of resin layers of composition A and resin layers of composition B; the thickness of each of the resin layers being from 1 to 100 nm and the thickness of each of 75% or more layers constituting the laminated film being 30 nm or less; and the film having a layer structure wherein the thicknesses of resin layers having the same composition A increase or decrease from the side of a surface of the laminated film toward the side of the other surface opposite thereto and wherein the maximum light ray reflectivity for unpolarized light is 25% or less in a wavelength range of 400 to 2500 nm.

2. The laminated film according to claim 1, comprising the resin layers of the composition A, and resin layers having a composition B; and having a layer structure wherein the thickness ratio between the resin layer having the composition A and the resin layer having the composition B which are adjacent to each other increases or decreases from the side of the surface of the laminated film toward the side of the other surface opposite thereto.

3. The laminated film according to claim 1, comprising the resin layers of the composition A, and resin layers having a composition B; and having a layer structure wherein the thicknesses of the resin layers having the composition A increase from the side of the surface of the laminated film toward the side of the other surface opposite thereto, and thicknesses of the resin layers having the composition B decrease from the side of the surface of the laminated film toward the side of the other surface opposite thereto.

4. The laminated film according to claim 1, having a layer structure wherein the thicknesses of the resin layers having the composition A increase from the first surface towards the center and then decrease from the center to the other surface or decrease from the first surface toward the center and then increase from the center to the other surface.

5. The laminated film according to claim 1, comprising a pair of adjacent resin layers wherein the ratio between the thicknesses of the adjacent layers (the thickness of the thin layer to that of the thick layer) is 0.8 or more and 1.0 or less, and a pair of adjacent ones of the resin layers wherein the ratio between the thicknesses of the adjacent layers is 0.01 or more and 0.5 or less.

6. The laminated film according to claim 1, wherein the number of the laminated layers is 50 or more.

7. The laminated film according to claim 2, comprising two thermoplastic resins having a refractive index difference of 0.05 or more.

8. The laminated film according to claim 3, comprising two thermoplastic resins having a refractive index difference of 0.05 or more.

9. The laminated film according to claim 4, comprising two thermoplastic resins having a refractive index difference of 0.05 or more.

10. The laminated film according to claim 2, comprising a pair of adjacent resin layers wherein the ratio between the thicknesses of the adjacent layers (the thickness of the thin layer to that of the thick layer) is 0.8 or more and 1.0 or less, and a pair of adjacent ones of the resin layers wherein the ratio between the thicknesses of the adjacent layers is 0.01 or more and 0.5 or less.

11. The laminated film according to claim 3, comprising a pair of adjacent resin layers wherein the ratio between the thicknesses of the adjacent layers (the thickness of the thin layer to that of the thick layer) is 0.8 or more and 1.0 or less, and a pair of adjacent ones of the resin layers wherein the ratio between the thicknesses of the adjacent layers is 0.01 or more and 0.5 or less.

12. The laminated film according to claim 4, comprising a pair of adjacent resin layers wherein the ratio between the thicknesses of the adjacent layers (the thickness of the thin layer to that of the thick layer) is 0.8 or more and 1.0 or less, and a pair of adjacent ones of the resin layers wherein the ratio between the thicknesses of the adjacent layers is 0.01 or more and 0.5 or less.

* * * * *